July 23, 1968 O. E. LARSEN 3,393,427
EXTRUSION DIE
Filed Dec. 27, 1965
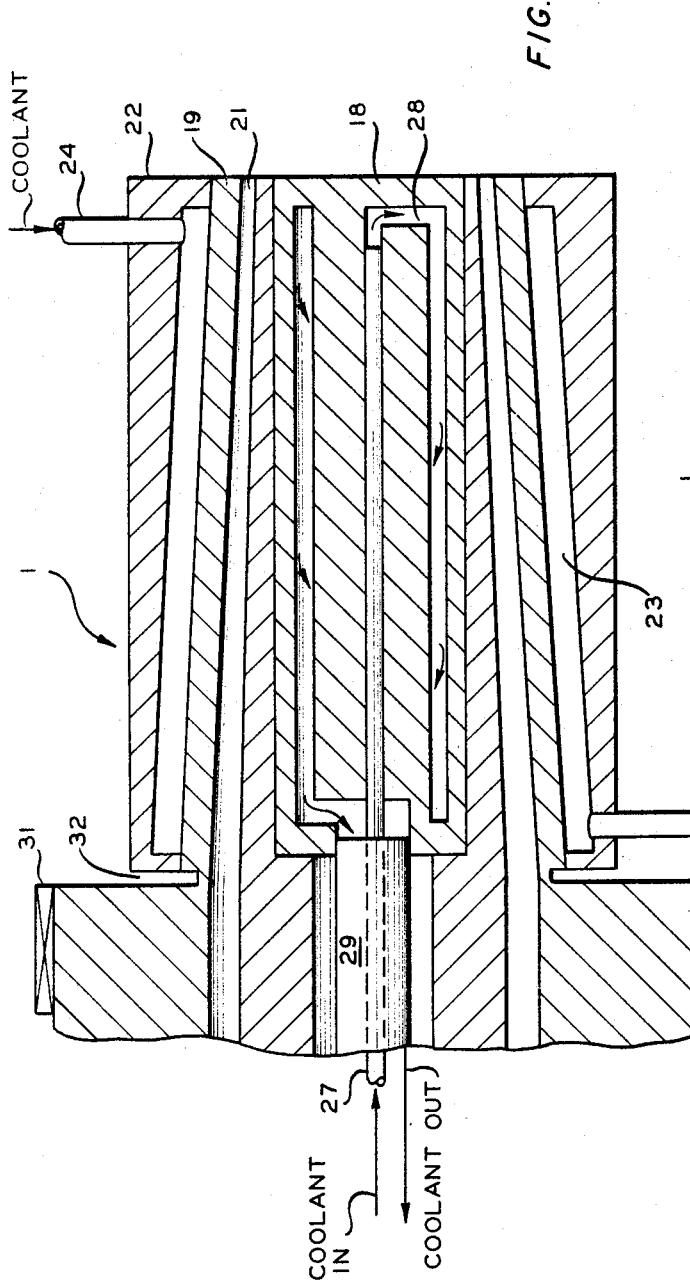
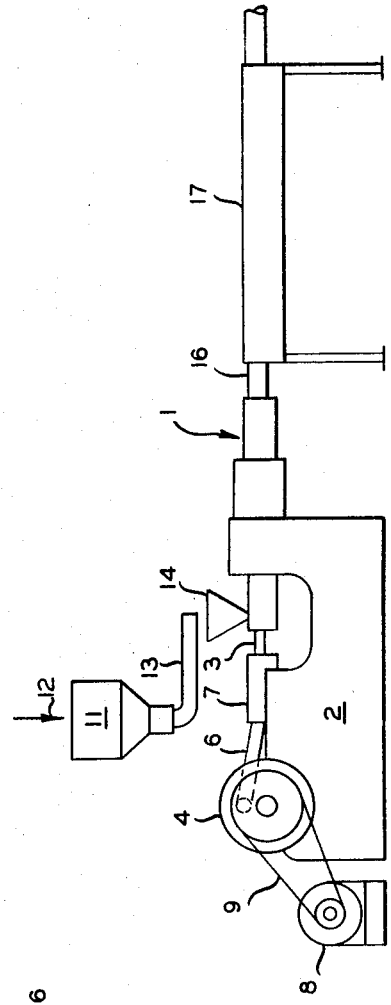
INVENTOR
O. E. LARSEN
BY *Young and Quigg*
ATTORNEYS United States Patent Office 3,393,427
Patented July 23, 1968

3,393,427
EXTRUSION DIE
Olaf E. Larsen, Bartlesville, Okla., assignor to Phillips Petroleum Company, a corporation of Delaware
Filed Dec. 27, 1965, Ser. No. 516,316
8 Claims. (Cl. 18—14)

ABSTRACT OF THE DISCLOSURE

The mandrel and bushing of an extrusion die are tapered so as to provide a converging annulus in the direction of travel of material extruded through the die.

---

This invention relates to the extrusion of plastic materials. In one aspect, this invention relates to a method of and apparatus for extruding thermoplastic materials to form elongated articles of preselected cross sectional configuration. In another aspect, this invention relates to dies for producing extrudates from molten plastic material.

One of the factors which limits the production rate of an article formed by extruding a plastic through a long land die is the rate at which heat can be removed from the article as it moves through the die. When an extrudate is formed so that it is self-supporting when it emerges from the die, the plastic must be cooled below its solidification temperature. This can be accomplished by a variety of ways including, for example, circulating a fluid coolant through the outer portions or bushing part of the die. Since the cooling and hence the solidification of the plastic material in the die causes the plastic to shrink slightly, the outer surface of the extrudate does not remain in contact with the interior surface of the bushing with the result being that a gap is formed between the partially solidified plastic and the interior surface of the bushing. This gap acts as an insulator between the bushing part of the die and the plastic to make the removal of heat from the plastic more difficult because the heat must now escape from the plastic by convection across the gap rather than by conduction when the plastic is in direct contact with the surface of the bushing.

According to this invention, these and other disadvantages in the production of articles by extrusion are overcome by means of a method and apparatus which affords a higher extrusion rate and a better product from the standpoint of surface characteristics. This is accomplished by providing the bushing part of the die with an inner surface having a taper which will compensate for the shrinkage of the plastic material as it solidifies. In a highly preferred embodiment of the invention, when a mandrel is used to form an extrudate which is tubular or of other hollow configuration, the mandrel part of the die can also be tapered. In this preferred embodiment, the mandrel taper is less than the taper of the inner surface of the bushing with the result that the annulus between the mandrel and the bushing converges in the direction of travel of the extrudate. When a mandrel of uniform cross section (no taper) is used, the bushing surface is tapered sufficiently to compensate for shrinkage. The die structure of this invention serves not only to eliminate the gap between the extrudate and the inner surface of the bushing and hence increases the rate at which the extrudate can be cooled but also produces an extrudate which is smooth and free of wrinkles primarily because it remains in contact with the inner surface of the bushing during its total residence time in the die. When the extrudate remains in contact with the inner surface of the bushing in the manner described, a force is continuously maintained against the entire outer surface of the extrudate during its travel through the passageway of the die. In the event that a mandrel is used to form a hollow article in accordance with a modification of the invention, a second force is maintained radially outward against the inner surface of the extrudate as it passes through the die.

Accordingly, it is an object of this invention to provide an improved method of and die for extruding plastic materials.

Another object of this invention is to increase the extrusion rate of articles formed from a plastic material.

A further object of this invention is to provide an extrusion die from which heat can be removed at a higher rate.

Still another object of this invention is to provide an extrusion die which results in the formation of a smoother surface extrudate free of wrinkles and the like.

These and other objects of the invention will become apparent to one skilled in the art after studying the following detailed description, the appended claims, and the accompanying drawings wherein:

FIGURE 1 is a diagrammatic illustration of an extrusion apparatus which can be used in conjunction with the extrusion die of this invention; and FIGURE 2 is a cross sectional view of an extrusion die of this invention.

In the practice of the method of this invention, an elongated article of preselected cross sectional configuration can be produced from a thermoplastic material by means of the steps including supplying said thermoplastic material to a passageway having a discharge end portion defining said cross sectional configuration, applying a force to said thermoplastic material in said passageway to effect movement of said thermoplastic material through said discharge end to form said article, and maintaining a force against the outer surface of the article during its travel through the passageway. The force on the outer surface of the article is obtained from the tapered inner surface of the die. In a modification of this method, when a mandrel is employed as a part of the die to form a hollow extrudate, a second force will be created and maintained radially outward against the inner surface of the article. The second force is created by the effect of the mandrel and the shrinkage which accompanies the solidification of the thermoplastic material.

The converging passageway obtained by providing the bushing part of the die with a tapered interior surface or by providing the die with a converging annulus between the mandrel and the interior surface of the bushing produces a back pressure on the extrudate as it travels through the die. This back pressure results in better plastification of the thermoplastic material. Another advantage obtained by extruding against back pressure of this type is that the thermoplastic material remains compacted as it solidifies, thus reducing the chance to form a void or imperfection.

Referring now to the drawings, wherein like reference numerals are used to denote like elements, and particularly to FIGURE 1, the invention will be described in more detail. Many valves, switches, controls, etc., not necessary in explaining the invention to one skilled in the art, have been omitted from the drawings for the sake of clarity.

The extrusion die of this invention, shown generally by reference numeral 1, is illustrated in conjunction with a dynamic extrusion apparatus including a frame 2 which supports a piston 3 connected to a flywheel 4 by means of a connecting rod 6 and a crosshead 7. A motor 8 and a belt 9 will reciprocate piston 3 in response to rotational motion of motor 8.

A thermoplastic material in particle form can be charged to a storage hopper 11 by any conventional conveying means 12. A spout 13 can be used to transmit the particles from storage hopper 11 to a feed hopper 14 which will direct the particles into position such that they can be contacted and advanced by piston 3 through the extrusion die 1. The extrudate 16 in the form of an elongated article can be supported by means of a support 17 after the extrudate emerges from the extrusion die 1. The support 17 can be provided with cooling means for further reducing the temperature of the extrudate 16.

Although the extrusion die 1 of this invention is illustrated as being used in conjunction with a dynamic extrusion apparatus, it is evident that this is for the purpose of illustration only and that the extrusion die can be used with any extruder including single screw extruders, multiple screw extruders having multiple dies, and the like providing they have the pumping capability necessary. If further details of the dynamic extrusion apparatus illustrated in FIGURE 1 are desired reference can be had to copending commonly assigned applications Ser. Nos. 389,348, filed Aug. 13, 1964, now Patent 3,266,097, issued Aug. 16, 1966; 389,392, filed Aug. 13, 1964, now Patent 3,281,900, issued Nov. 1, 1966; and 499,242, filed Oct. 21, 1965, now Patent 3,309,436, issued Mar. 14, 1967.

Referring now to FIGURE 2 of the drawings, the novel extrusion die 1 of this invention will be described in more detail. It is obvious that the invention is not bound by the exact configuration illustrated in FIGURE 2 since the novel concept of providing a converging annulus for the extrudate can be applied to various and sundry extrusion dies of different modification.

The extrusion die 1 includes a mandrel 18 and a bushing 19 positioned around the mandrel and spaced therefrom to define an annulus 21. A cooling jacket 22 is positioned around the bushing 19 and spaced therefrom to define an annular chamber 23 through which a coolant such as water or the like can be circulated by means of inlet conduit 24 and outlet conduit 26. The conduit means 24 and 26 and cooling jacket 22 are merely illustrative of a means which can be associated with the bushing 19 for cooling the extrusion die.

The interior of the extrusion die 1 can be cooled by another cooling means including inlet conduit 27 connected to passageways 28 disposed interiorly of mandrel 18 for the purpose of dispersing a coolant throughout all sections of the mandrel. The coolant passageways 28 terminate in the form of a coolant exit passageway 29 which will serve to transmit the coolant from within the mandrel as indicated by the arrows.

The extrusion die 1 can be attached to the plastification chamber of an extrusion apparatus by any suitable means. An electric band heater 31 positioned around the extrusion apparatus adjacent the upstream end of the extrusion die will insure that the plastic material is molten as it enters the extrusion die. A heat dam 32 in the form of a circumferential groove between the plastification chamber and the extrusion die will insulate and prevent heat transfer from the plastification chamber to the extrusion die. If desired, an insulating gasket constructed of a thermosetting resin or the like can be inserted in the heat dam 32. The relative positions of the electric band heater 31, the heat dam 32, and the annular chamber 23 produces a sharp freeze line between the molten and solid state of the plastic material being formed.

The relative size and shape of the mandrel 18 and bushing 19 which define the annulus 21 in the extrusion die of this invention can vary over wide limits. The only requirement is that there be sufficient convergence of annulus 21 in the direction of travel of the extrudate to insure that the extrudate remains in contact with the inner surface of the bushing 19 during its travel through the extrusion die. Thus, the mandrel 18 can have a surface which does not taper such as a cylinder when a cylindrical pipe is being extruded or such as a prism of square or rectangular cross section when channel pipe having square or rectangular cross section is being formed.

Although the relative taper of the mandrel 18 and the bushing 19 can vary within wide limits, depending in part upon the shrinkage factor for the material being extruded, it is generally preferred that the annulus formed between the mandrel and the bushing converge in the direction of travel of the extrudate at a rate of at least 1 mil per inch over the length of the extrusion die. Thus, when the die is constructed of a mandrel of uniform cross section either in the form of a circle or parallelogram, the inner surface of the bushing positioned around the mandrel can have a taper of at least about 1 mil per inch. This amount of taper bushing with a mandrel of uniform cross section provides a converging annulus between the mandrel and the bushing of about 1 mil per inch. In the preferred degree of convergence, the difference in the taper of the mandrel and the taper of the bushing is about 3 mils per inch.

As hereinbefore indicated, the extrusion die of this invention comprises a mandrel and a bushing positioned around said mandrel and spaced therefrom, said bushing having a taper in the direction of travel of the extrudate as the extrudate passes through said die to provide said die with a converging annulus between said mandrel and said bushing in the direction of travel of the extrudate. In general, it is preferred that the mandrel be tapered within the range of about 0 to about 15 mils per inch, that the bushing be tapered within the range of about 1 to about 25 mils per inch, and that the difference in the taper of the mandrel and the taper of the bushing is at least about 1 mil per inch. From this range, it is evident that the difference in the taper of the mandrel and the bushing or the degree of convergence of the annulus between the mandrel and the bushing varies from 1 mil per inch to 25 mils per inch.

Any thermoplastic material such as a natural or synthetic resin can be extruded by the extrusion die of this invention. Exemplary materials which can be extruded through the die of this invention include polyolefins, polyamides, polyesters, fluorocarbon polymers, acetyl resins, polycarbonates, vinyl polymers, acrylic polymers, polystyrene, and the like. Polyolefins such as polyethylene and ethylene-butene copolymers having a molecular weight greater than 100,000 are particularly suited for extrusion by this invention.

The following examples illustrate the improved results obtained by extruding with an extrusion die constructed in accordance with this invention.

*Example 1*

An ethylene-butene copolymer of 1.4 HLMI (ASTM D1238–62T, Condition F) having a density of 0.956 (ASTM D1505T) containing about 1 weight percent glycerin and about 2.5 weight percent carbon black was extruded into one-inch, Schedule 40 pipe to illustrate the increased rate of extrusion obtained with a converging annulus between the mandrel and the bushing of the die. The following data from the several runs conducted are reported in Table I below:

TABLE I

| Run No. | Taper (Mils/in.) | | Degree of Convergence of Annulus (Mils/inch) | Extrusion Rate (In./min.) |
|---|---|---|---|---|
| | Mandrel | Bushing | | |
| Control A | 0 | 0 | 0 | 1 to 2. |
| Control B | 4 | 4 | 0 | 4 to 5. |
| Control C | 6 | 6 | 0 | 5. |
| 1 | 6 | 7 | 1 | 13*. |
| Control D | 3 | 3 | 0 | Approx. 1. |
| Control E | 6 | 6 | 0 | Approx. 2. |
| 2 | 4 | 6 | 2 | 4. |

*The pipe produced by this run exhibited extremely good outside appearance from a standpoint of being free of wrinkles and uneven spots.

Controls A, B, and C in the above table are intended to serve as a basis for Run No. 1. Controls D and E form a basis for Run No. 2. The differences in the control runs, for example Control C and Control E, can be attributed to the fact that the extrusion was conducted under slightly different conditions.

The extrusion rate reported is the approximate maximum rate at which the pipe can be extruded in its solidified form such that it was self-supporting and thus wrinkle-free upon emerging from the extrusion die. It is evident that by comparing Run No. 1 with Controls A, B, and C the extrusion rate was substantially increased with an annulus convergence of 1 mil per inch. Similarly, the extrusion rate is at least double in Run No. 2 as compared to the extrusion rates for Control Runs D and E.

*Example II*

A copolymer similar to Example I was formed into a blend containing 10 weight percent carbon black, 0.5 weight percent glycerin, and 0.5 weight percent isopropyl alcohol (diluent for the glycerin). This blend was extruded into 2.5-inch pipe to further illustrate the increased rate of extrusion obtained with a convering annulus between the mandrel and the bushing of the die. The data from these runs are reported in Table II below:

TABLE II

| Run No. | Taper (Mils/in.) | | Degree of Convergence of Annulus (Mils/inch) | Extrusion Rate (In./min.) |
|---|---|---|---|---|
| | Mandrel | Bushing | | |
| Control F | 6 | 6 | 0 | 6.5 |
| 3 | 3 | 6 | 3 | 12 |

From the above data it can be seen that the rate is about doubled in Run 3 as compared with the extrusion rate for Control Run F. The reason the extrusionr ate for Control Run F differs from the extrusion rates for the control runs in Table I is because the extrusion conditions and die are different.

Although the invention has been described in considerable detail, it must be understood that such detail is for that purpose only and that many modifications and variations can be made by one skilled in the art without departing from the spirit and scope of the invention.

I claim:
1. A long land die for producing an extrudate from a molten plastic by extrusion comprising a mandrel and a bushing positioned around said mandrel and spaced therefrom, said bushing and said mandrel each tapering inwardly in different amounts in the direction of travel of the extrudate as the extrudate passes through said die to provide said die with a converging annulus between said mandrel and said bushing in the direction of travel of the extrudate, and the amount of taper on said mandrel being less than the amount of taper on said bushing.

2. A die according to claim 1 wherein the annulus between said mandrel and said bushing converges at a rate of at least about 1 mil per inch.

3. A die according to claim 1 wherein said mandrel has a positive finite taper of up to about 15 mils per inch; said bushing is tapered within the range of about 1 to about 25 mils per inch; and the difference in the taper of said mandrel and the taper of said bushing is at least about 1 mil per inch.

4. A die according to claim 1 wherein said mandrel is tapered about 6 mils per inch and said bushing is tapered about 7 mils per inch.

5. A die according to claim 1 wherein said mandrel is tapered about 4 mils per inch and said bushing is tapered about 6 mils per inch.

6. A die according to claim 1 wherein the difference in the taper of said mandrel and the taper of said bushing is about 3 mils per inch.

7. A die according to claim 1 having means associated therewith for cooling said extrudate as it travels through said die.

8. A die according to claim 7 wherein said means for cooling said extrudate includes first conduit means for circulating a fluid through said mandrel to remove heat from the interior of said extrudate and second conduit means for circulating a fluid in contact with said bushing to remove heat from the exterior of said extrudate.

References Cited

UNITED STATES PATENTS

| 3,270,371 | 9/1966 | Schiedrum et al. | 18—14 |
| 3,308,509 | 4/1967 | Hsia | 18—14 |
| 1,717,620 | 6/1929 | Page | 18—128 |
| 2,572,677 | 10/1951 | Trench | 18—12 |
| 2,736,064 | 2/1956 | Rubin | 18—12 X |
| 3,024,494 | 3/1962 | Sapila | 18—13 |
| 3,095,608 | 2/1963 | Munsell | 18—14 X |
| 3,233,286 | 2/1966 | Batosti et al. | |

FOREIGN PATENTS

| 391,285 | 8/1965 | Switzerland. |

WILLIAM J. STEPHENSON, *Primary Examiner.*